United States Patent [19]
Ishikawa et al.

[11] Patent Number: 6,089,682
[45] Date of Patent: Jul. 18, 2000

[54] ANTILOCK BRAKE CONTROL SYSTEM FOR VEHICLE

[75] Inventors: Teruyasu Ishikawa, Osaka; Isao Matsuno, Nagano, both of Japan

[73] Assignees: NEC Corporation, Tokyo; Nissin Kogyo Co., Ltd., Ueda, both of Japan

[21] Appl. No.: 08/872,334

[22] Filed: Jun. 10, 1997

[30] Foreign Application Priority Data

Jun. 11, 1996 [JP] Japan ................................ 8-148834

[51] Int. Cl.[7] .................................................. B60T 8/84
[52] U.S. Cl. ..................... 303/163; 303/150; 303/196; 701/80
[58] Field of Search ................................ 303/137, 150, 303/194, 195, 196, 119.1, 163, 165, 171, 199, 173, 149; 701/71, 73, 78, 80, 82, 83

[56] References Cited

U.S. PATENT DOCUMENTS

| | | | |
|---|---|---|---|
| 4,057,299 | 11/1977 | Jones | 303/122.05 |
| 4,823,269 | 4/1989 | Fujioka et al. | 303/196 |
| 5,117,934 | 6/1992 | Tsuyama et al. | 701/80 |
| 5,263,548 | 11/1993 | Tsuyama et al. | 701/73 |
| 5,320,422 | 6/1994 | Tsuyama et al. | 303/150 |
| 5,404,302 | 4/1995 | Matsuda et al. | 701/71 |
| 5,411,325 | 5/1995 | Tanaka et al. | 303/150 |
| 5,418,724 | 5/1995 | Liboshi | |
| 5,474,368 | 12/1995 | Sano | 303/163 |
| 5,573,313 | 11/1996 | Suzuki et al. | 303/137 |
| 5,676,434 | 10/1997 | Ichikawa et al. | 303/150 |

FOREIGN PATENT DOCUMENTS 3-16866  1/1991  Japan .

*Primary Examiner*—Robert J. Oberleitner
*Assistant Examiner*—Thomas J. Williams
*Attorney, Agent, or Firm*—Nikaido, Marmelstein, Murray & Oram LLP

[57] ABSTRACT

An antilock brake control system for a vehicle includes a control start determining device for determining that an antilock brake control should be started, in response to a slip rate calculated based on a wheel speed and a presumed vehicle speed exceeding a start determination threshold value determined as a function of the presumed vehicle speed. The control start determining device changes the function of the presumed vehicle speed for calculating the start determination threshold value, based on the state of the antilock brake control for a wheel other than a wheel which is subjected to the determination by the control start determining device, and the results of the determinations by the road surface friction coefficient determining device and the bad-road determining device. Thus, appropriate antilock brake control for the situation of a road surface is conducted.

5 Claims, 3 Drawing Sheets

ANTILOCK BRAKE CONTROL SYSTEM FOR VEHICLE

BACKGROUND OF THE INVENTION

1. Field of the Invention

The present invention relates to an antilock brake control system for a vehicle, including wheel speed detecting means for detecting a wheel speed, vehicle speed calculating means for calculating a presumed vehicle speed based on the wheel speed detected by the wheel speed detecting means, slip rate calculating means for calculating a slip rate based on the wheel speed detected by the wheel speed detecting means and the presumed vehicle speed calculated in the vehicle speed calculating means, and a control start determining means for calculating a start determination threshold value as a function of the presumed vehicle speed calculated in the vehicle speed calculating means and for determining that an antilock brake control should be started, in response to the slip rate calculated in the slip rate calculating means exceeding the start determination threshold value.

2. Description of the Related Art

An antilock brake control system is already known, for example, from Japanese Patent Application Laid-open No. 3-16866, in which the condition for starting the antilock brake control is when the slip rate exceeds the start determination threshold value.

In the above known system, however, the start determination threshold value is set constant irrespective of the situation of a road surface, and an antilock brake control suitable for a variation in situation of the road surface cannot be performed. Thus, it is desirable that when the friction coefficient of a road surface is relatively low, the start determination threshold value for determining the start of the antilock brake control is set at a relatively low value in order to enhance the stability of the vehicle body. However, if the start determination threshold value is set at a relatively low value during traveling of the vehicle on a bad road, the turning ON and OFF of the antilock brake control may be frequently repeated in some cases due to undulation on a road surface, thereby providing discomfort to an occupant.

SUMMARY OF THE INVENTION

Accordingly, it is an object of the present invention to provide an antilock brake control system for a vehicle, wherein an antilock brake control suitable for the situation of a road surface can be performed.

To achieve the above object, according to the present invention, there is provided an antilock brake control system for a vehicle, comprising wheel speed detecting means for detecting a wheel speed, vehicle speed calculating means for calculating a presumed vehicle speed based on the wheel speed detected by the wheel speed detecting means, slip rate calculating means for calculating a slip rate based on the wheel speed detected by the wheel speed detecting means and the presumed vehicle speed calculated in the vehicle speed calculating means, and control start determining means for calculating a start determination threshold value as a function of the presumed vehicle speed calculated in the vehicle speed calculating means and for determining that an antilock brake control should be started, in response to the slip rate calculated in the slip rate calculating means exceeding the start determination threshold value, wherein the antilock brake control system further includes road surface friction coefficient determining means for determining a friction coefficient of a road surface, and bad-road determining means for determining whether the vehicle is traveling on a bad road, and the control start determining means is arranged to change the function of the presumed vehicle speed for calculating the start determination threshold value, based on a state of an antilock brake control for a wheel other than a wheel which is subjected to the determination by the control start determining means, and results of determinations by the road surface friction coefficient determining means and the bad-road determining means.

With such arrangement, the control start determining means changes the function of the presumed vehicle speed for calculating the start determination threshold value, based on the state of antilock brake control for the wheel other than the wheel which is subjected to the determination by the control start determining means, the result of the determination by the road surface friction coefficient determining means for determining the friction coefficient of the road surface and the result of the determination by the bad-road determining means for determining whether the vehicle is traveling on the bad road. Thus, an appropriate start determination threshold value can be determined depending upon the situation of a road surface and an antilock brake control suitable for the situation of the road surface can be performed.

The above and other objects, features and advantages of the invention will become apparent from the following description of the preferred embodiment taken in conjunction with the accompanying drawings.

DETAILED DESCRIPTION OF THE PREFERRED EMBODIMENT

The present invention will now be described by way of an embodiment applied to a motorcycle with reference to FIGS. 1 to 3.

Figure 1:
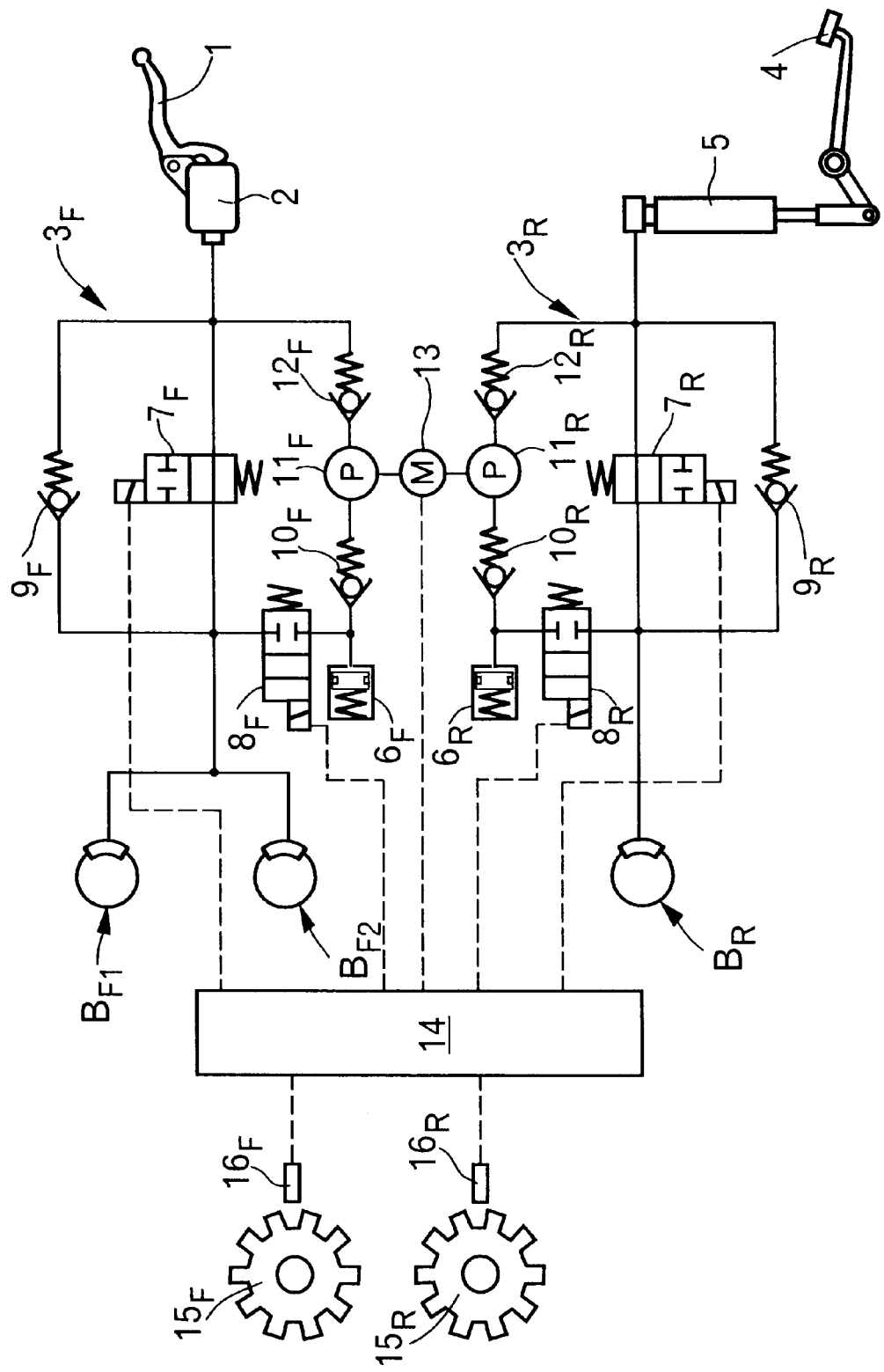
FIG. 1 is a diagrammatic illustration of the entire arrangement of a brake system in a motorcycle.

Referring first to FIG. 1, a braking fluid pressure regulating means $3_F$ is provided between a master cylinder 2 adapted to output a fluid pressure depending upon the operation of a brake lever 1 and a pair of left and right front wheel brakes $B_{F1}$ and $B_{F2}$ mounted to a front wheel of a motorcycle. The braking fluid pressure regulating means $3_F$ is capable of regulating braking fluid pressures for the front wheel brakes $B_{F1}$ and $B_{F2}$. A rear wheel braking fluid pressure regulating means $3_R$ is provided between a master cylinder 5 adapted to output a fluid pressure depending upon the operation of a brake pedal 4 and a rear wheel brake $B_R$ mounted on a rear wheel of the motorcycle, and is capable of regulating a braking fluid pressure for the rear wheel brake $B_R$.

The braking fluid pressure regulating means $3_F$ includes a reservoir $6_F$, a normally-opened solenoid valve $7_F$ mounted between both the front wheel brakes $B_{F1}$ and $B_{F2}$ and the master cylinder 2, a normally-closed solenoid valve $8_F$ mounted between the reservoir $6_F$ and both the front wheel brakes $B_{F1}$ and $B_{F2}$, a check valve $9_F$ connected parallel to the normally-opened solenoid valve $7_F$ to permit a braking fluid to flow from both the front wheel brakes $B_{F1}$ and $B_{F2}$ toward the master cylinder 2, and a return pump $11_F$ having an inlet connected to the reservoir $6_F$ through an intake valve $10_F$ and an outlet connected to the master cylinder 2 through a discharge valve $12_F$.

The braking fluid pressure regulating means $3_R$ is constructed in the same manner as is the front wheel braking fluid pressure regulating means $3_F$, and includes a reservoir $6_R$, a normally-opened solenoid valve $7_R$, a normally-closed solenoid valve $8_R$, a check valve $9_R$, an intake valve $10_R$, a return pump $11_R$, and a discharge valve $12_R$.

Moreover, the return pump $11_F$ of the braking fluid pressure regulating means $3_F$ and the return pump $11_R$ of the braking fluid pressure regulating means $3_R$ are driven by a common motor 13.

Controlled by a control unit 14 are the normally-opened and closed solenoid valves $7_F$ and $8_F$ of the braking fluid pressure regulating means $3_F$, the normally-opened and closed solenoid valves $7_R$ and $8_R$ of the braking fluid pressure regulating means $3_R$ and the motor 13. Inputted to the control unit 14 are output signals from a front wheel speed sensor $16_F$ fixedly disposed on an opposed relation to a side of a pulser gear $15_F$ fixed to the front wheel, and a rear wheel speed sensor $16_R$ fixedly disposed on an opposed relation to a side of a pulser gear $15_R$ fixed to the rear wheel. The control unit 14 controls the operations of the normally-opened solenoid valves $7_F$ and $7_R$, the normally-closed solenoid valves $8_F$ and $8_R$ and the motor 13 in accordance with the outputs from the sensors $16_F$ and $16_R$.

Figure 2:
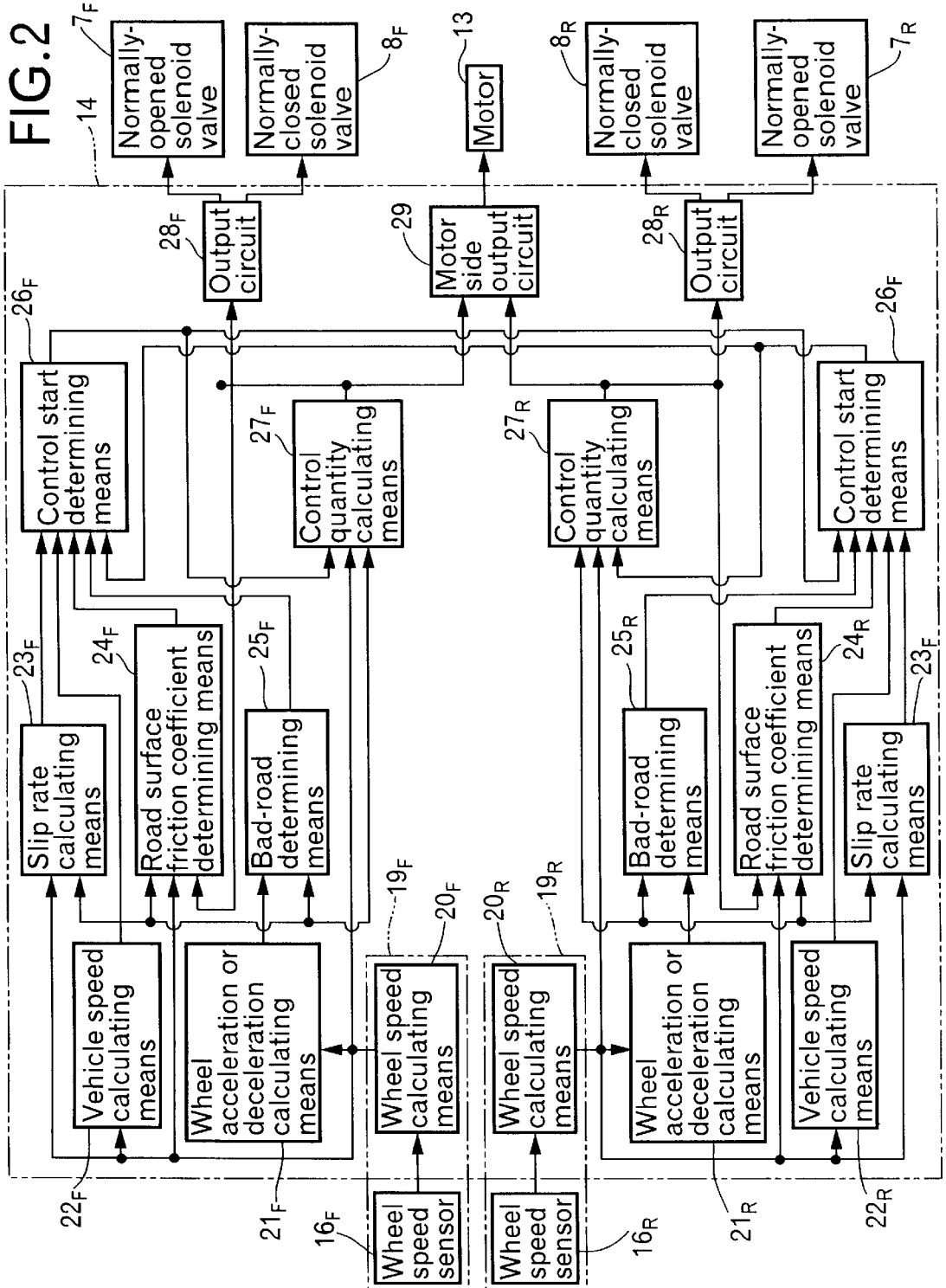
FIG. 2 is a block diagram illustrating the arrangement of a control unit.

Referring to FIG. 2, the control unit 14 includes a wheel speed calculating means $20_F$, a wheel acceleration or deceleration calculating means $21_F$, a vehicle speed calculating means $22_F$, a slip rate calculating means $23_F$, a road surface friction determining means $24_F$, a bad-road determining means $25_F$, a control start determining means $26_F$, a control quantity calculating means $27_F$, and an output circuit $28_F$, all in correspondence to the braking fluid pressure regulating means $3_F$ for the front wheel. The control unit 14 also includes a wheel speed calculating means $20_R$, a wheel acceleration or deceleration calculating means $21_R$, a vehicle speed calculating means $22_R$, a slip rate calculating means $23_R$, a road surface friction determining means $24_R$, a bad-road determining means $25_R$, a control start determining means $26_R$, a control quantity calculating means $27_R$, and an output circuit $28_R$, all in correspondence to the braking fluid pressure regulating means $3_R$ for the rear wheel. Further, the control unit 14 includes a motor-side output circuit 29 in correspondence to the motor 13 common to both the braking pressure regulating means $3_F$ and $3_R$.

The front wheel speed calculating means $20_F$ calculates a front wheel speed under reception of the output signal from the front wheel speed sensor $16_F$, and constitutes a front wheel speed detecting means $19_F$ together with the front wheel speed sensor $16_F$. The rear wheel speed calculating means $20_R$ calculates a rear wheel speed under reception of the output signal from the front wheel speed sensor $16_R$, and constitutes a rear wheel speed detecting means $19_R$ together with the rear wheel speed sensor $16_R$.

Control signals from the control quantity calculating means $27_F$ and $27_R$ for the front and rear wheels are applied to the motor-side output circuit 29, and the operation and stoppage of the motor 13 are switched over from one to another by the motor-side output circuit 29.

The wheel acceleration or deceleration calculating means $21_F$ and $21_R$, the vehicle speed calculating means $22_F$ and $22_R$, the slip rate calculating means $23_F$ and $23_R$, the road surface friction coefficient determining means $24_F$ and $24_R$, the bad-road determining means $25_F$ and $25_R$, the control start determining means $26_F$ and $26_R$, the control quantity calculating means $27_F$ and $27_R$, and the output circuits $28_F$ and $28_R$ have the same function. Therefore, only the wheel acceleration or deceleration calculating means $21_F$, the vehicle speed calculating means $22_F$, the slip rate calculating means $23_F$, the road surface friction coefficient determining means $24_F$, the bad-road determining means $25_F$, the control start determining means $26_F$, the control quantity calculating means $27_F$ and the output circuit $28_F$ for the front wheel will be described below, and the description of the wheel acceleration or deceleration calculating means $21_R$, the vehicle speed calculating means $22_R$, the slip rate calculating means $23_R$, the road surface friction coefficient determining means $24_R$, the bad-road determining means $25_R$, the control start determining means $26_R$, the control quantity calculating means $26_R$ and the output circuits $28_R$ for the rear wheel is omitted.

The wheel acceleration or deceleration calculating means $21_F$ differentiates the front wheel speed calculated in the front wheel speed calculating means $20_F$ in the front wheel speed detecting means $19_F$ to provide a front acceleration or deceleration. The vehicle speed calculating means $22_F$ calculates a presumed vehicle speed based on the wheel speed detected by the wheel speed detecting means $19_F$. The presumed vehicle speed based on the wheel speed is calculated in the vehicle speed calculating means $22_F$, so that the maximum deceleration becomes a preset deceleration in the course of decreasing of the wheel speed during an antilock brake control, and so that the maximum acceleration becomes a preset acceleration in the course of increasing of the wheel speed. Further, a wheel slip rate is calculated in the slip rate calculating means $23_F$ based on the wheel speed detected by the wheel speed detecting means $19_F$ and the presumed vehicle speed calculated in the vehicle speed calculating means $22_F$. More specifically, if the slip rate is represented by SR; the presumed vehicle speed is represented by CVR and the wheel speed is represented by VW, the slip rate SR is calculated according to the following equation:

$$SR=(CVR-VW)/CVR$$

Output signals from the vehicle speed calculating means $22_F$, the wheel speed detecting means $19_F$, and the control start determining means $26_F$ are inputted to the control quantity calculating means $27_F$. When it is determined by the control start determining means $26_F$ that the antilock brake control should be started, the control quantity calculating means $27_F$ calculates a control quantity for controlling the braking fluid pressures for the front wheel brakes $B_{F1}$ and $B_{F2}$ based on the presumed vehicle speed calculated in the vehicle speed calculating means $22_F$ and the wheel speed detected by the wheel speed detecting means $19_F$ to output it. The control signal indicative of a command to control the braking fluid pressures for the front wheel brakes $B_{F1}$ and $B_{F2}$ is applied from the control quantity calculating means $27_F$ to the output circuit $28_F$, and the energization and deenergization of the normally-opened solenoid valve $7_F$ and the normally-closed solenoid valve $8_F$ in the braking fluid pressure regulating means $3_F$ are switched over from one to another by the output circuit $28_F$.

The output signals from the vehicle speed calculating means $22_F$, the wheel speed detecting means $19_F$ and the control quantity calculating means $27_F$ are inputted to the road surface coefficient determining means $24_F$, and the road surface coefficient determining means $24_F$ determines whether the road friction coefficient is lower than the constant value by comparing the vehicle deceleration calculated based on the output control signals from the presumed vehicle speed, the wheel speed and the control quantity calculating means $27_F$ and the preset value.

The output signals from the vehicle speed calculating means $22_F$, the wheel acceleration or deceleration calculating means $21_F$ are inputted to the bad-road determining means $25_F$, and the bad-road determining means $25_F$ determines whether a road on which the vehicle is traveling is a bad road, with reference to the frequency of a variation in wheel acceleration or deceleration, based on the presumed vehicle speed and the wheel acceleration or deceleration.

The presumed vehicle speed CVR calculated by the vehicle speed calculating means $22_F$, the slip rate SR calculated by the slip rate calculating means $23_F$, the result of the determination by the road surface friction coefficient determining means $24_F$, the result of the determination by the bad-road determining means $25_F$ and the result of the control start determination by the control start determining means $26_R$ for the rear wheel are inputted to the control start determining means $26_F$. The control start determining means $26_F$ determines whether the antilock brake control should be started, according to a procedure shown in FIG. 3, based on these inputted signals.

Figure 3:
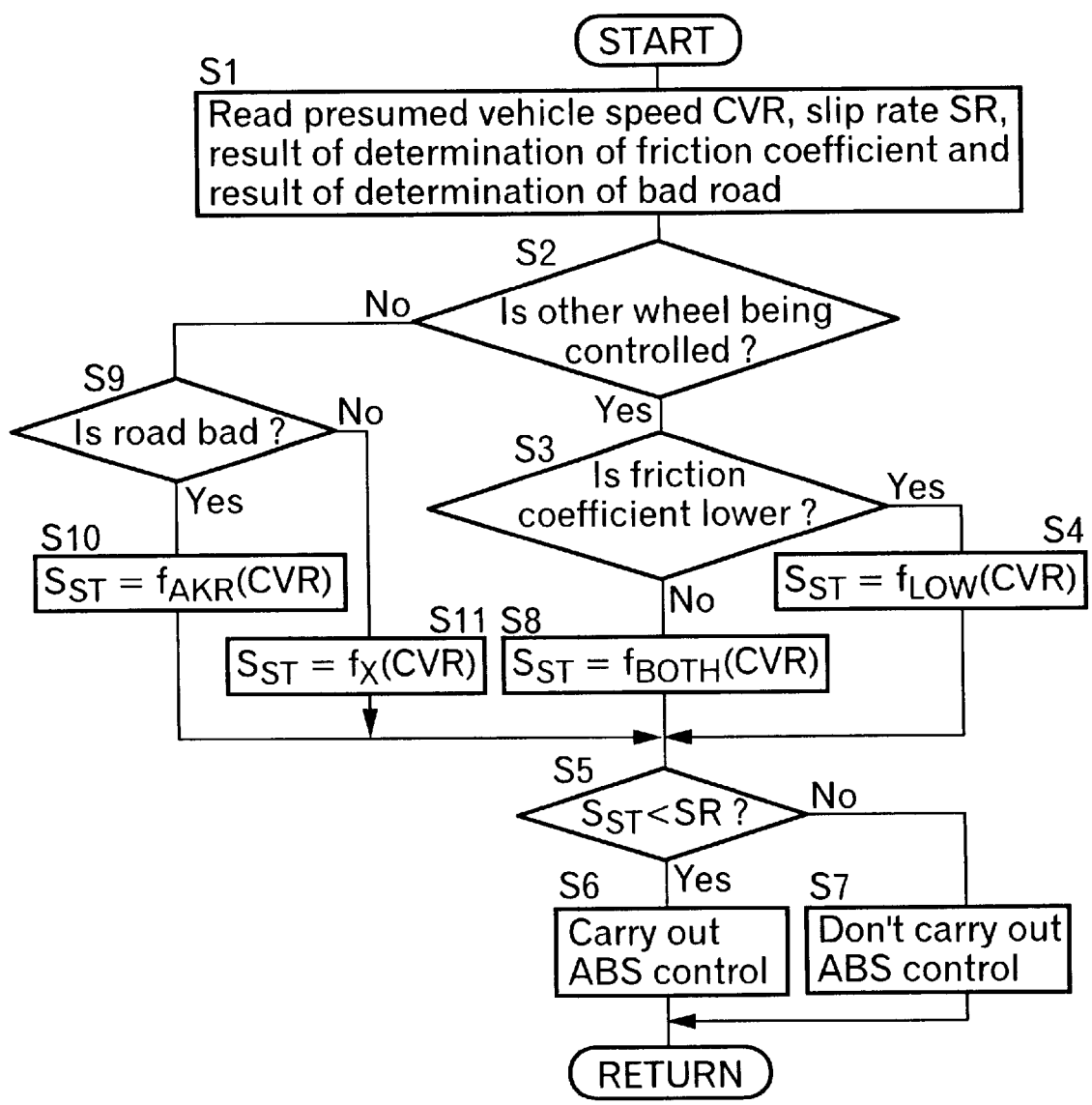
FIG. 3 is a flow chart illustrating a procedure of determining the start of a control by a control start determining means.

At step S1 in FIG. 3, the presumed vehicle speed CVR, the slip rate SR, the result of the determination of the road surface friction coefficient and the result of the bad-road determination are read. At step S2, it is determined whether the other wheel is under the antilock brake control, i.e., it is confirmed whether it has been determined by the control start determining means $26_R$ that the antilock brake control should be carried out. If the other wheel is under the antilock brake control, it is confirmed at step S3 whether it has been determined by the road surface friction coefficient determining means $24_F$ that a road surface on which the vehicle is traveling is a road surface of a lower friction coefficient. If the road surface is the road surface of a lower friction coefficient, the processing is advanced to step S4.

At step S4, a start determination threshold value $S_{ST}$ determined by a function $f_{Low}$(CVR) of the presumed vehicle speed CVR is calculated, and at next step S5, it is determined whether $S_{ST}$<SR. If the slip rate SR exceeds the start determination threshold value $S_{ST}$ ($S_{ST}$<SR), a signal indicative of the fact that the antilock brake control should be carried out is outputted at step S6. If the slip rate SR is equal to or smaller than the start determination threshold value $S_{ST}$ ($S_{ST}$≦SR), a signal indicative of the fact that the antilock brake control should be not carried out is outputted at step S7.

If it is confirmed at step S3 that a road surface of a higher friction coefficient has been determined by the road surface friction coefficient determining means $24_F$, a start determination threshold value $S_{ST}$ determined by a function $f_{BOTH}$(CVR) of the presumed vehicle speed CVR is calculated at step S8, progressing to step S5.

If it is determined at step S2 that the other wheel is not under the antilock brake control, the processing is advanced from step S2 to step S9, at which it is confirmed whether it has been determined by the bad-road determining means $25_F$ that a road on which the vehicle is traveling is a bad road. If the road is the bad road, a start determination threshold value $S_{ST}$ determined by a function $f_{AKR}$(CVR) of the presumed vehicle speed CVR is calculated at step S10, progressing to step S5. If the road is not the bad road, a start determination threshold value $S_{ST}$ determined by a function $f_X$(CVR) of the presumed vehicle speed CVR is calculated at step S11, progressing to step S5.

The function of such control start determining means $26_F$ will be summarized below. The control start determining means $26_F$ changes the function of the presumed vehicle speed for calculating the start determination threshold value $S_{ST}$, based on the state of the antilock brake control of the wheel (rear wheel) other than the wheel which is subjected to the determination by the control start determining means $26_F$, and the results of the determinations by the road surface friction coefficient determining means $24_F$ and the bad-road determining means $25_F$. When the slip rate SR exceeds the start determination threshold value $S_{ST}$, the control start determining means $26_F$ determines that the antilock brake control should be carried out. More specifically, the control start determining means $26_F$ calculates the start determination threshold value $S_{ST}$ by the function $f_{LOW}$(CVR) for the road surface of the lower friction coefficient in the state that the other wheel is under the antilock brake control; calculates the start determination threshold value $S_{ST}$ by the function $f_{BOTH}$(CVR) for the road surface of the higher friction coefficient; calculates the start determination threshold value $S_{ST}$ by the function $f_{AKR}$(CVR) for the bad road in the state that the other wheel is under the antilock brake control; calculates the start determination threshold value $S_{ST}$ by the function $f_X$(CVR) for the non-bad road; and determines that the antilock brake control should be carried out, when the slip rate SR exceeds the start determination threshold values $S_{ST}$ determined by the different functions $f_{LOW}$(CVR), $f_{BOTH}$(CVR), $f_{AKR}$(CVR) and $f_X$(CVR), respectively.

The operation of this embodiment will be described below. The antilock brake control of the front wheel brakes $B_{F1}$ and $B_{F2}$ and the antilock brake control of the rear wheel brake $B_R$ are started at the time when it is determined by the control start determining means $26_F$ and $26_R$ that the slip rate SR exceeds the start determination threshold value $S_{ST}$. In this case, the start determination threshold value SST is calculated based on the function varied depending upon the state of the antilock brake control for the wheel other than the wheel subjected to the determination by the control start determining means $26_F$, $26_R$ and the results of the determinations by the road surface friction coefficient determining means $24_F$, $24_R$ and the bad-road determining means $25_F$, $25_R$. More specifically, in a condition in which the other wheel is under the antilock brake control, the start determination threshold values $S_{ST}$ are calculated respectively by the function $f_{LOW}$(CVR) corresponding to the road surface of the lower friction coefficient and by the function $f_{BOTH}$ (CVR) corresponding to the road surface of the higher friction coefficient. In a condition in which the other wheel is not under the antilock brake control, the start determination threshold values $S_{ST}$ are calculated respectively by the function $f_{AKR}$(CVR) corresponding to the bad road and by the function $f_X$(CVR) corresponding to the non-bad road.

Therefore, as compared with the prior art in which the start determination threshold value is set constant irrespective of the situation of a road surface, an appropriate antilock brake control suitable for the situation of a road surface can be performed, thereby enhancing the stability of the vehicle on a road surface of a lower friction coefficient. Moreover, it is possible to avoid the frequent repetition of the turning ON/OFF of antilock brake control during traveling of the vehicle on a bad road to prevent a discomfort from being applied to an occupant.

Although the embodiment of the present invention has been described in detail, it will be understood that the present invention is not limited to the above-described embodiment, and various modifications may be made without departing from the spirit and scope of the invention defined in claims.

For example, in the above-described embodiment, the presumed vehicle speeds are calculated by the vehicle speed calculating means $22_F$ and $22_R$ individually corresponding to the front and rear wheels, respectively. However, a presumed vehicle speed common to the front and rear wheels may be calculated based on wheel speeds detected by the front and rear wheel speed calculating means $19_F$ and $19_R$. The present invention is also applicable not only to the motorcycle but also to a four-wheel automobile vehicle or the like.

What is claimed is:

1. An antilock brake control system for a vehicle, comprising wheel speed detecting means for detecting a wheel speed, vehicle speed calculating means for calculating a presumed vehicle speed based on the wheel speed detected by the wheel speed detecting means, slip rate calculating means for calculating a slip rate based on the wheel speed detected by the wheel speed detecting means and the presumed vehicle speed calculated in the vehicle speed calculating means, and a control start determining means for calculating a start determination threshold value as a function of the presumed vehicle speed calculated in the vehicle speed calculating means and for determining that an antilock brake control should be started, in response to the slip rate calculated in the slip rate calculating means exceeding the start determination threshold value, wherein said antilock brake control system further includes road surface friction coefficient determining means for determining a friction coefficient of a road surface, and bad-road determining means for determining whether the vehicle is traveling on a bad road, and said control start determining means is arranged to change the function of the presumed vehicle speed for calculating the start determination threshold value, based on a state of an antilock brake control for a wheel other than a wheel which is subjected to the determination by the control start determining means, and results of determinations by the road surface friction coefficient determining means and the bad-road determining means.

2. An antilock brake control system for a vehicle according to claim 1, wherein said control start determining means is arranged to change the function of the presumed vehicle speed for calculating the start determination threshold value in accordance with the result of the determination by said road surface friction coefficient determining means in a condition where the wheel other than the wheel which is subjected to the determination by said control start determining means is under the antilock brake control, and to change the function of the presumed vehicle speed for calculating the start determination threshold value in accordance with the result of the determination by said bad-road determining means in a condition where the wheel other than the wheel which is subjected to the determination by said control start determining means is not under the antilock brake control.

3. An antilock brake control system for a vehicle according to claim 1 or 2, wherein said road surface friction coefficient determining means is arranged to determine the friction coefficient of the road surface by comparison of a vehicle deceleration calculated based on the presumed vehicle speed calculated in said vehicle speed calculating means as well as the wheel speed detected by said wheel speed detecting means with a preset value.

4. An antilock brake control system for a vehicle according to claim 1 or 2, further including wheel acceleration or deceleration calculating means for differentiating the wheel speed detected by said wheel speed detecting means to provide a wheel acceleration or deceleration, and wherein said bad-road determining means is arranged to determine whether a road on which the vehicle is traveling is a bad road, based on the presumed vehicle speed calculated in said vehicle speed calculating means as well as the wheel acceleration or deceleration calculated in the wheel acceleration or deceleration calculating means.

5. An antilock brake control system for a vehicle according to claim 1, wherein said wheel speed detecting means, said vehicle speed calculating means, said slip rate calculating means and said control start determining means are provided in correspondence to front and rear wheels of a motorcycle, respectively.

* * * * *